(12) United States Patent
Spiegelman et al.

(10) Patent No.: US 7,937,380 B2
(45) Date of Patent: May 3, 2011

(54) SYSTEM AND METHOD FOR RECOMMENDED EVENTS

(75) Inventors: Michael Spiegelman, Los Angeles, CA (US); William MacDonald White, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 157 days.

(21) Appl. No.: 11/615,544

(22) Filed: Dec. 22, 2006

(65) Prior Publication Data

US 2008/0154696 A1 Jun. 26, 2008

(51) Int. Cl.
*G06F 7/00* (2006.01)
*G06F 17/30* (2006.01)
(52) U.S. Cl. ........................................ 707/705
(58) Field of Classification Search ............... 707/705
See application file for complete search history.

(56) References Cited

U.S. PATENT DOCUMENTS

| | | | | |
|---|---|---|---|---|
| 5,991,735 | A * | 11/1999 | Gerace | 705/10 |
| 7,068,189 | B2 * | 6/2006 | Brescia | 340/995.1 |
| 7,412,042 | B2 * | 8/2008 | Henry | 379/201.01 |
| 7,437,368 | B1 * | 10/2008 | Kolluri et al. | 707/10 |
| 7,584,123 | B1 * | 9/2009 | Karonis et al. | 705/26 |
| 7,589,628 | B1 * | 9/2009 | Brady, Jr. | 340/539.11 |
| 2003/0115113 | A1 * | 6/2003 | Duncan | 705/26 |
| 2004/0161097 | A1 * | 8/2004 | Henry | 379/266.02 |
| 2004/0199387 | A1 * | 10/2004 | Wang et al. | 704/243 |
| 2004/0199525 | A1 * | 10/2004 | Matsuda et al. | 707/100 |
| 2005/0192820 | A1 * | 9/2005 | Simon et al. | 705/1 |
| 2006/0195479 | A1 * | 8/2006 | Spiegelman et al. | 707/104.1 |
| 2006/0195480 | A1 * | 8/2006 | Spiegelman et al. | 707/104.1 |
| 2007/0060112 | A1 * | 3/2007 | Reimer | 455/414.2 |
| 2007/0162335 | A1 * | 7/2007 | Mekikian | 705/14 |

* cited by examiner

*Primary Examiner* — Cam Y Truong
*Assistant Examiner* — Michael Pham
(74) *Attorney, Agent, or Firm* — James J. DeCarlo; Greenberg Traurig, LLP (57) ABSTRACT

Systems and methods have been developed for selecting and recommending events to a consumer of media content based on information known about the consumer, including the consumer's interests, consumption history and preferences. In an embodiment, a system records a history of the media content accessed, purchased, viewed or otherwise consumed by a consumer. The system further includes an event database containing information about upcoming events. When a consumer interacts with the system, such as to access a media content item, the consumer is notified of one or more events based on the consumer's history. In this way consumers are automatically provided with updated event recommendations based on the known interests of the consumer, without the need for the consumer to subscribe to an event recommendation service and maintain the subscription to accurately reflect the consumer's current interests.

25 Claims, 4 Drawing Sheets

SYSTEM AND METHOD FOR RECOMMENDED EVENTS

BACKGROUND

More and more information is being placed on the Internet as a means of distributing the information efficiently to potentially interested consumers. One example of this is calendars or listings of community events.

There are two commonly used methods for distributing information about community events using the Internet. The first method is providing a bulletin board style web page in which community event information may be uploaded to a server and displayed on a web site. These systems may simply list events and, possibly, allow for easy sorting by parameters such as location and event type and searching by keyword.

A second method is operating an electronic mailing list associated with a database of event information. The mailing list allows notifications of events to be transmitted to consumers that have registered with the mailing list, part of the registration being to provide criteria of what events the consumer wishes to be notified of.

One drawback of both of these methods is that they require significant personal interaction and are generally not convenient nor effective for the ultimate recipient. The bulletin boards require a consumer to periodically access the bulletin board to identify new events that may be of interest. This may require a review of hundreds of events on the bulletin board.

The mailing list method is also time consuming as the consumer receives and must evaluate each communication from the mailing list, many of which may not be of interest to the consumer. Furthermore, the consumer may not receive notification of events that would otherwise be of interest. Thus, a need exists for a more efficient way to provide consumers with event information.

SUMMARY

Against this backdrop systems and methods have been developed for selecting and recommending events to a consumer of media content based on information known about the consumer, including the consumer's interests, consumption history and preferences. In an embodiment, a system records a history of the media content accessed, purchased, viewed or otherwise consumed by a consumer. The system further includes an event database containing information about upcoming events. When a consumer interacts with the system, such as to access a media content item, the consumer is notified of one or more events based on the consumer's history. In this way consumers are automatically provided with updated event recommendations based on the known interests of the consumer, without the need for the consumer to subscribe to an event recommendation service and maintain the subscription to accurately reflect the consumer's current interests.

One aspect of the disclosure is a method of notifying consumers of events. The method includes maintaining a consumer profile for a consumer, in which the consumer profile includes a location associated with the consumer. The system then receives a request from the consumer for a media content item, such as a request to render a song or video to the consumer. For each request, the system stores, in the consumer's profile, interest data identifying the media content item as being associated with the consumer. The system then determines if the media content item is associated with a first event known to the system based on event data stored in an event database accessible to the system. The method then includes transmitting, to the consumer in response to the request for the media content item, a notification of the first event based on the consumer's location and the consumer's interest data.

Another aspect of the disclosure is a method of recommending events to a consumer. This method includes transmitting, in response to a consumer request received via a user interface on a device associated with the consumer, one or more songs to the device. Information is then stored identifying the consumer including a consumer location of the consumer. The method further includes selecting at least one upcoming event from a database of upcoming events, wherein each upcoming event is associated with an event location and an event description and wherein the selecting is based at least in part on the one or more songs transmitted to the device, the event location, the consumer location and the event description.

Yet another aspect of the disclosure is a system for recommending events. The system includes a first datastore, such as a database or computer-readable media containing files, of media content items; a second datastore of events, each event having an event location and event data associating the event with one or more media content items; and a third datastore of consumer profiles; each consumer profile associated with a consumer and including a consumer location and consumption information, the consumption information identifying media content items requested by the associated consumer. The system is provided with a user interface module that, in response to a request from a first consumer for a first media content item in the first datastore, transmits a notification of a first event to the first consumer. The first event is selected based on the event data in the second datastore associating the first event with the first media content item and the consumer profile of the first consumer in the third datastore.

Yet another aspect of the disclosure is a computer-readable medium encoding computer-executable instructions for performing a method of recommending an event to a consumer. The method includes receiving a request to access a media player via a consumer device. The method further includes retrieving a consumer profile containing consumer information including a consumer location and a consumption history of at least one media content item previously rendered by the media player to the consumer. A first event is then selected based on consumer location and the consumption history. In addition, the method includes generating a graphical user interface wherein at least a portion of the graphical user interface displays event data for the first event.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Systems and methods are disclosed for selecting and recommending events to a consumer of media content based on information known about the consumer, including the consumer's interests, consumption history and preferences. In this way, the consumer of media is automatically alerted to events that are potentially of interest to the consumer based on that consumer's consumption.

Figure 1:
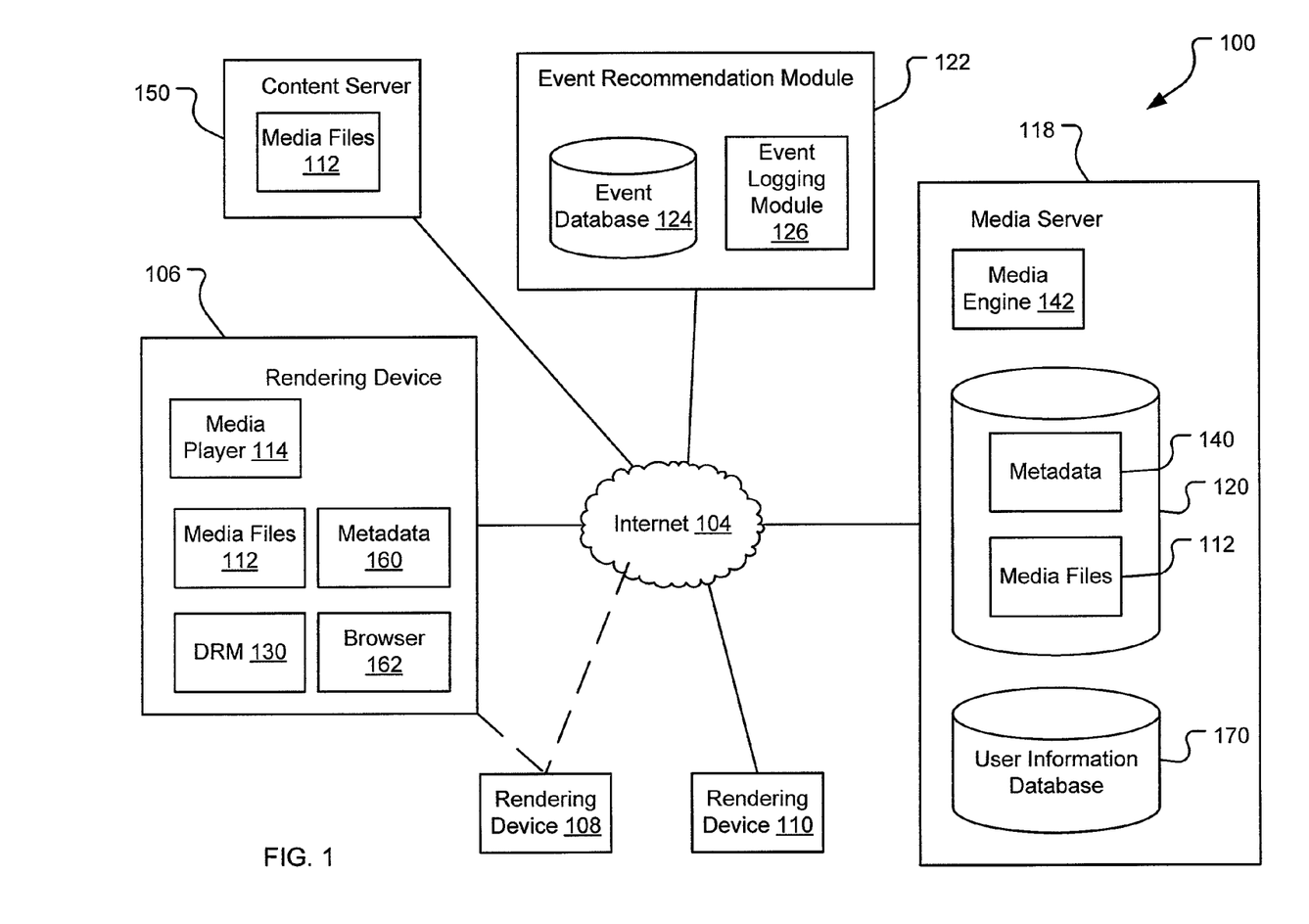
FIG. 1 is an illustration of a network architecture of connected computing devices as might be used to distribute and render media files.

FIG. 1 is an illustration of a network architecture of connected computing devices as might be used to distribute and render media files. The architecture includes a consumer device 106 in communication with a media server 1018 via a network 104.

In the architecture 100, the various computing devices are connected via a network 104. One example of a network 104 is the Internet. Another example is a private network of interconnected computers, however, any communication network, now known or later developed, may be used including for example a cellular phone network, an simple text messaging network, a paging network or some other network. The format and contents that are communicated between the various computing devices may differ depending on the network used. For example, if the Internet 104 is the network the communications may take the form of Hypertext Transfer Protocol (HTTP) requests and responses in which data files are transferred between devices. If the network is a mobile telephone network such as a Global System for Mobile Communications (GSM) network, communications may comply with some other communication protocol such as the Short Message Service (SMS) Point-to-Point protocol.

Examples of computing devices suitable for use in a distributed computing architecture 100 are well known in the art. By way of example, computing devices such as the user's devices 106, 108, 110 or as a server 118, 122, 150 include a processor and memory for storing data and software. Computing devices may further be provided with operating systems and may be able execute software applications in order to manipulate, transmit and receive data. In the computing device, local files, such as a media file 112, may be stored on a mass storage device (not shown) that is connected to or part of any of the computing devices described herein. A mass storage device and its associated computer-readable media, provide non-volatile storage that can be accessed by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The architecture 100 further includes a plurality of computing devices 106, 108, 110, referred to as rendering devices 106, 108, 110, capable of rendering media content items, such as media files 112 or streams of media data of some format. Many different types of devices may be rendering devices, as long as they are capable of rendering media files or streaming media. A rendering device may be a personal computer (PC), web enabled cellular telephone, personal digital assistant (PDA) or the like, capable of receiving media data over the network 104, either directly or indirectly (i.e., via a connection with another computing device).

For example, as shown in FIG. 1, one rendering device is a personal computer 106 provided with various software modules including a media player 114, one or more media files 112, metadata 160, a digital rights management engine 130 and a browser 162. The media player 114, among other functions, provides the ability to convert information or data into a perceptible form and manage media related information or data so that user may personalize their experience with various media content items. Media player 114 may be incorporated into the rendering device by a vendor of the device, or obtained as a separate component from a media player provider or in some other art recognized manner. As will be further described below, it is contemplated that media player 114 may be a software application, or a software/firmware combination, or a software/firmware/hardware combination, as a matter of design choice, that serves as a central media manager for a user of the rendering device and facilitates the management of all manner of media content items and services that the user might wish to access either through a computer or a personal portable device or through network devices available at various locations via a network.

The browser 162 can be used by a consumer to identify and retrieve media files 112 accessible through the network 104. An example of a browser includes software modules such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users. In an embodiment, the browser 162 and media player 114 may operate jointly to allow media files 112 or streaming media data to be rendered in response to a single consumer input, such as selecting a link to a media file 112 on a web page rendered by the browser 162.

Another example of a rendering device is a music player device 108 such as an MP3 player that can retrieve and render media files 112 directly from a network 104 or indirectly from another computing device connected to the network 104. One skilled in the art will recognize that a rendering device 106, 108, 110 may be configured in many different ways and implemented using many different combinations of hardware, software, or firmware.

A rendering device, such as the personal computer 106, also may include storage of local media files 112 and/or other plug-in programs that are run through or interact with the media player 114. A rendering device also may be connectable to one or more other portable rendering devices that may or may not be directly connectable to the network 104, such as a compact disc player and/or other external media file player, commonly referred to as an MP3 player, such as the type sold under the trade name IPOD by Apple Computer, Inc., that is used to portably store and render media files. Such portable rendering devices 108 may indirectly connect to the media server 118 and content server 150 through a connected rendering device 106 or may be able to connect to the network 104, and thus directly connect to the computing devices 106, 118, 150, 110 on the network. Portable rendering devices 108 may implement location tagging by synchronizing with computing devices 118, 150, 110 on the network 104 whenever the portable rendering devices 108 is directly connected to a computing device in communication with the network 104. In an embodiment, any necessary communications may be stored and delayed until such a direct connection is made.

A rendering device 106, 108, 110 further includes storage of information about the media files 112, such as in the form of metadata 160. The metadata 160 stored as individual files, as ancillary data within a media file 112 or within some other data structure on the storage of the rendering device or temporarily stored in memory of the rendering device for use when rendering an associated media file 112.

The architecture 100 also includes one or more content servers 150. Content servers 150 are computers connected to the network 104 that store media files 112 remotely from the rendering devices 106, 108, 110. For example, a content server 150 may include several podcast feeds and each of the media files identified by the feeds. In another example, a content server 150 may be any server from which the user may obtain a media content item. One advantage of networked content servers is that as long as the location of a media file 112 is known a computing device with the appropriate software can access the media file 112 through the network 104. This allows media files 112 to be distributed across multiple content servers 150. It also further allows for a single "master" media file to be maintained at one location that is accessible to the mass market and thereby allow the publisher to control access. Through the connection to the network 104, rendering devices 106, 108, 110 may retrieve, either directly or indirectly, the media files 112. After the media files 112 are retrieved, the media files 112 may be rendered to the user, also known as the content consumer, of the rendering device 106, 108, 110.

In an embodiment, media files can be retrieved from a content server 150 over a network 104 via a location address or locator, such as a uniform resource locator or URL. An URL is an example of a standardized Internet address usable, such as by a browser 162, to identify files on the network 104. Other locators are also possible, though less common.

The embodiment of the architecture 100 shown in FIG. 1 further includes a media server 118. The media server 118 can be a server computer or group of server computers connected to the network 104 that work together to provide services as if from a single network location or related set of network locations. In a simple embodiment, the media server 118 could be a single computing device such as a personal computer. However, in order to provide services on a mass scale to multiple rendering devices, an embodiment of a media server 118 may include many different computing devices such as server computers, dedicated datastores, routers, and other equipment distributed throughout many different physical locations.

The media server 118 may include software or servers that make other content and services available and may provide administrative services such as managing user login, service access permission, digital rights management, and other services made available through a service provider. Although some of the embodiments of the invention are described in terms of media content items that are music and particularly in the form of songs, embodiments can also encompass any form of streaming or non-streaming media data including but not limited to news, entertainment, sports events, books, web page or perceptible audio or video content. It should be also be understood that although the present invention is described in terms of media content and specifically audio content, the scope of the present invention encompasses any content or media format heretofore or hereafter known.

The media server 118 may also include a user database 170 of user information. The user information database 170 includes information about users that is collected from users, such as media consumers accessing the media server 118 with a rendering device, or generated by the media server 118 as the user interacts with the media server 118. In one embodiment, the user information database 170 includes user information such as user name, gender, e-mail and other addresses, user preferences, etc. that the user may provide to the media server 118. Particularly, the user will be associated with one or more known locations. The locations may be simple addresses or may be more general descriptions of cities, such as Denver, Colo., San Francisco, Calif., or Edinburgh, Scotland, or regions such as Colorado's Front Range, the Bay Area, or the Edinburgh Castle neighborhood. In addition, the server 118 may collect information such as what podcasts the user has subscribed to, what media files the user has listened to, what media files the user has purchased and/or added to the user's playlist, what searches the user has performed, how the user has rated various media content such as podcasts, songs, movies, artists, etc. In effect, any information related to the user and the media that a user consumes may be stored in the user information database 170.

One type of user information of particular interest is user playlists. Playlists refer to lists of media content items created by a particular user. In some systems, a user may, via subscription have access to all the media content items in the media database 120. User playlists are then used for the user to quickly and easily find and access media content items of particular interest to the user. The playlists may be named, such as "my favorite bluegrass songs" or "my songs", and may represent the user's most liked media. In an embodiment, the system may track what media content items appear in the user's playlists in addition to recording what media content items a user actually renders over time. Such user information for a particular user is referred to as the user's profile and discussed as an identifiable set of data. However, one skilled in the art may recognize that the information may be stored in a relational form in a the user information database 170 so that there is, in fact, no identifiable data structure that corresponds to the user profile.

The user information database 170 may also include information about a user's rendering device 106, 108 or 110. The information allows the media server 118 to identify the rendering device by type and capability.

Media server 118 includes or is connected to a media database 120. The database 120 may be distributed over multiple servers, discrete datastores, and locations. The media database 120 stores various metadata 140 associated with different media files 112 on the network 104. The media database 120 may or may not store media files 112 and for the purposes of this specification it is assumed that at least some of the media files 112 of interest are located on remote content servers 150 that are not associated with the media server 118. The metadata 140 may include details about the media file 112 such as its location information, in the form of a URL, with which the media file 112 may be obtained. In an embodiment, this location information may be used as a unique ID for a media file 112.

The metadata 140 stored in the media database 120 includes metadata 140 that describes the media files 112. Such metadata 140 may include information identifying: the artist or artists of a media file 112; the publisher of the media file 112; if music, the album from which the media file 112 was obtained; the release data of the media file 112; various categorization information such as genre of the media file 112; and reviews, ratings and other information supplied by third parties describing the media file 112. The metadata of pre-existing media files 112 may then be stored and maintained centrally on the media server 118 and thus made available to all users.

In the embodiment shown, the media server 118 may periodically update the information stored in the media database 120. This maintains the currency of data as the server 118 searches for new media files 112 and for media files 112 that have been moved or removed from access to the internet 104. The media database 120 may include all of the information provided by the media file 112 by the publisher. In addition, the media database 120 may include other information, such as portion definitions, generated by consumers and transmitted to the media server 118. Thus, the media database 120 may contain information not known to or generated by the publisher of a given media file 112.

In an embodiment, the media database 120 includes additional metadata 140 regarding media files 112 in the form of "tags." A tag is a keyword chosen by a user to describe a particular item of content such as a feed, a media file 112 or portion of a media file 112. The tag can be any word or combination of key strokes. Each tag submitted to the media server may be recorded in the media database 120 and associated with the content the tag describes. Tags may be associated with a particular feed (e.g., a series tag), associated with a specific media file 112 (e.g., an episode tag) or an identified portion of a media file 112. Tags will be discussed in greater detail below.

Since tags can be any keyword, a typical name for a category, such as "science" or "business," may also be used as a tag and in an embodiment the initial tags for a media file 112 are automatically generated by taking the descriptions contained within metadata within a pre-existing media file 112 and using them as the initial tags for the media file 112. However, note that tags need not be a hierarchical category system that one "drills down" through. Tags are not hierarchically related as is required in the typical categorization scheme. Tags are also cumulative in that the number of users that identify a series or an episode with a specific tag are tracked. The relative importance of the specific tag as an accurate description of the associated content (i.e., series, episode, media file or portion of media file) is based on the number of users that associated that tag with the content.

In an embodiment, consumers of media files 112 are allowed to provide information to be associated with the media file 112 or a portion of the media file 112. Thus the user after consuming media data may rate the content, say on a scale of 1-5 stars, write a review of the content, and enter tags to be associated with the content. All this consumer-generated data may be stored in the media database 120 and associated with the appropriate media file 112 for use in future searches.

In one embodiment, the media engine 142 creates a new entry in the media database 120 for every media file 112 it finds. Initially, the entry may contain some or all of the information provided by the media file 112 itself. An automatic analysis may or may not be performed to match the media file 112 to known tags based on the information provided in the media file 112. For example, in an embodiment some media files 112 include metadata such as a category element and the categories listed in that element for the media file 112 are automatically used as the initial tags for the media file 112. While this is not the intended use of the category element, it is used as an initial tag as a starting point for the generation of more accurate tags for the media file 112. Note that searches on terms that appear in the media file 112 metadata will return that media file 112 as a result, so it is not necessary to provide tags to a new entry for the search to work properly. Initially no ratings information or user reviews are associated with the new entry. The manager of the media server may solicit additional information from the publisher such as the publisher's recommended tags and any additional descriptive information that the publisher wishes to provide but did not provide in the media file 112 itself.

The media database 120 may also include such information as reviews of the quality of the feeds, including reviews of a given media file 112. The review may be a rating such as a "star" rating and may include additional descriptions provided by users. The media database 120 may also include information associated with publishers of the media file 112, sponsors of the media file 112, or people in the media file 112.

The media server 118 includes a media engine 142. In an embodiment, the media engine 142 provides a graphical user interface to users allowing the user to search for and render media files 112 and portions of media files 112 using the media server 118. The graphical user interface may be an .HTML page served to a rendering device for display to the user via a browser. Alternatively the graphical user interface may be presented to the user through some other software on the rendering device. Through the graphical user interface, the media engine 142 receives user search criteria. The search engine 142 then uses these parameters to identify media files 112 or portions of media files 112 that meet the user's criteria. The search may involve an active search of the network, a search of the media database 120, or some combination of both. The search may include a search of the descriptions provided in the media files 112. The search may also include a search of the tags and other information associated with media files 112 and portions of the media files 112 listed in the media database 120, but not provided by the media files themselves. The results of the search are then displayed to the user via the graphical user interface.

In one embodiment of the present invention, similar to the DRM software 130 located on a rendering device 106, the media server may maintain its own DRM software (not shown) which tracks the digital rights of media files located either in the media database 120 or stored on a user's processor. Thus, for example, before the media server 118 streams or serves up or transfers any media files to a user, it validates the rights designation of that particular piece of media and only serves streams or transfers the file if the user has the appropriate rights.

The architecture 100 further includes an event recommendation module 122 and an event database 124. In the embodiment shown, the recommendation module 122 and the event database 124 reside on a separate server 122 and are independent from the media server 118. In an alternative embodiment, the recommendation module 122 and event database 124 are components of the media server 118 and may be incorporated into the media server 118. Thus, depending upon the implementation the recommendation module 122 may be software executing on a media server 118 or may represent an independent computing device in communication with the media server 118. Regardless of the implementation, the recommendation module 122 is a system that receives event data describing upcoming events. Such events may be concerts, conventions, conferences, plays, film screenings, free events, fundraisers, sporting events, parades, holiday events, festivals, carnivals, performing art events, promotional events, contests, and tours, to name but a few.

The event data received for each event includes any and all information provided by the person registering the event to describe the event. For example, event data for an event may include an event location (e.g., the Rock Bottom Brewery, $17^{th}$ street and Lawrence, Denver, Colo. 80202 or Latitude=36 degrees, 47.3 minutes South; Longitude=141 degrees, 43.6 minutes East), event title (e.g., Rolling Stones), an event description (e.g., the Rolling Stones to play an outdoor concert), an event category (e.g., music concert, play, dog show, etc.), and an event date (Thursday, Nov. 22, 2006 at 6:30 pm). In addition, event data may include further event association data provided specifically to associate the event with media content items such as media files (e.g., a list of Rolling Stones songs), with artists of media content items (e.g., information identifying that this event should be associated with the Rolling Stones and the Beatles), with particular classes of users (e.g., that users with a particular demographic such as an age range, income range, preferred activities or consumption history should be associated with this event) and/or with a specific location. In an embodiment, a URL or other information allowing a user to register for the event online may also be provided.

For the purposes of simplicity, the balance of the disclosure will either refer to event data for events in general or may provide specific examples in the form of an event that is a music concert by an artist that is also the artist of previously released songs for which media files 112 are available through the media server 118. In addition, the artist has been categorized into a known genre and sufficient user information is known to identify a demographic of potential consumers that may be interested in the concert.

In an embodiment, event data may be received via an event logging module 126 from any source including concert promoters, event organizers, state or local agencies such as parks and recreation departments, artists, event facility owners and operators or interested fans that wish to "spread the word" of the event. Alternatively, the event logging module 126 may retrieve events from other event databases such as community databases, artists' schedules, and venue listings. For the purposes of this disclosure, a party supplying event data will be referred to as an event promoter. In an embodiment, the event logging module 126 may be accessible via the network 104 and, through a user interface, allow event promoters to enter event data. As described above with reference to the media server 118, a user interface for receiving event data may take the form of one or more HTML pages that can be accessed via a browser and through which event data may be provided and stored into the event database 124.

Event data may further include an identification of criteria to be meet for a consumer to be notified of the event. For example, a certain consumer demographic may be included in the event data as required criteria for a notification to sent, in addition to an association between the consumer's consumption history and the event data. For example, a promoter may wish to target a specific demographic such as males with incomes greater than a threshold amount located in a specified area. The promoter may have provided these criteria as association requirements that must be meet prior to transmitting the event notification, in addition to the consumer accessing the media content item. For example, a concert event featuring an artist which is sponsored by a automobile company may wish to target potential purchasers of the company's vehicles. Thus, the event promoter may be less inclined to advertise the event to the artist's fans than to advertise the event to the potential purchasers of the company's vehicle. The requirements may be in addition to association between the consumer's consumption history and the event data, thus resulting only in notification of consumers that both meet the additional criteria and have a consumption history that associates them with the event.

For each particular event, one or more parties (e.g., promoters, venue owners, artists) with a monetary interest in the promotion of the event may be identified or otherwise provided. These parties may offer to pay to have the recommendation module 122 advertise the event by recommending it to users that meet certain requirements. The requirements may further be provided separately or included as event data for the event. In an embodiment, the event promoter entering the event data may contract with the recommendation system in a manner and with contract terms similar to that used for general online advertising (i.e., payment made to the module 122 operator based on number of viewings of the event data by a consumer, number of registrations received through event data displayed by the module 122 or other information indicative that the event data was displayed to the target market). In an alternative embodiment, the event data may include information, such as a coupon, an access code, or a ticket through which it may be determined that an attendee of the event learned of the event from the event data supplied by the event recommendation module 122. Compensation of the module 122 may then occur based on the number of attendees that provide this information at the event. For example, upon confirmation that a consumer attended an event (e.g., based on location information from a consumer's mobile device, use of a coupon or showing of an entry ticket provided by the system as part of the notification), the event promoter may be billed a previously determined amount.

The event recommendation module 124 has access to the user information database 170 and compares the event data with the user information. The comparison is an attempt to identify users known to the user information database that are likely to be interested in one or more events in the event database. This comparison is repeated over time so that the users of the media server 118 are constantly apprised of any new events that they may be interested in based on their history of media consumption and interaction with the media server 118.

As discussed in greater detail below, the event recommendation module 122 may compare event data for each event with user information for each user. In one embodiment, the comparison may include a location comparison in which events that are not co-located with the user are filtered out. In another embodiment, the comparison may include a preferences comparison in which a set of user preferences concerning events is used to filter the event data. Such preferences may include selection of artists, locations, genres, promoters, event types, or any other event metric that the user is specifically interested or disinterested in receiving notifications for. In yet another embodiment, the event recommendation module 122 is adapted to determine what media content item the user is currently accessing, and based on the user's location, provide the user with upcoming events that are associated with the currently accessed content item.

For the purposes of this disclosure, a user that receives media content items, such as media files 112, from or by means of the media server 118 and for which user information, and particularly information identifying the user's consumption of the media content item, is stored in the user information database 170 shall be referred to generally as consumers. This is to distinguish the consumers from other parties, such as users that are providing event data to the event recommendation module 122, artists, promoters or other parties that are associated with an event or a media content item in some way as to be compensated by or to compensate the event recommendation module 122 for event notifications.

Consumers of media content items may be notified by the event recommendation module 122 of upcoming events if the event recommendation module 122 determines that there is a sufficient association between the event data and the consumer's information maintained in the consumer's user profile. Depending on the purposes of the operator of the event recommendation module 122, the level of association required to trigger a notification may be very high or very low. For example, in an embodiment an operator of the event recommendation module 122 may wish to notify a consumer only of events for which the operator is fairly certain that the consumer will find of interest. In this embodiment, for an event to be selected, the module 122 must determine that the consumer is collocated with the event location and has extensively consumed media content items in the recent past that are directly related with the event data (e.g., the artist of the event is the same artist as media content items that are clearly favorites of the consumer based on the consumer's consumption history). In an alternative embodiment, an operator of the event recommendation module 122 may wish to notify a consumer of as many events as possible. In this embodiment, for an event to be selected, the module 122 may only determine that the consumer's location is within some distance of the event location.

Figure 2:
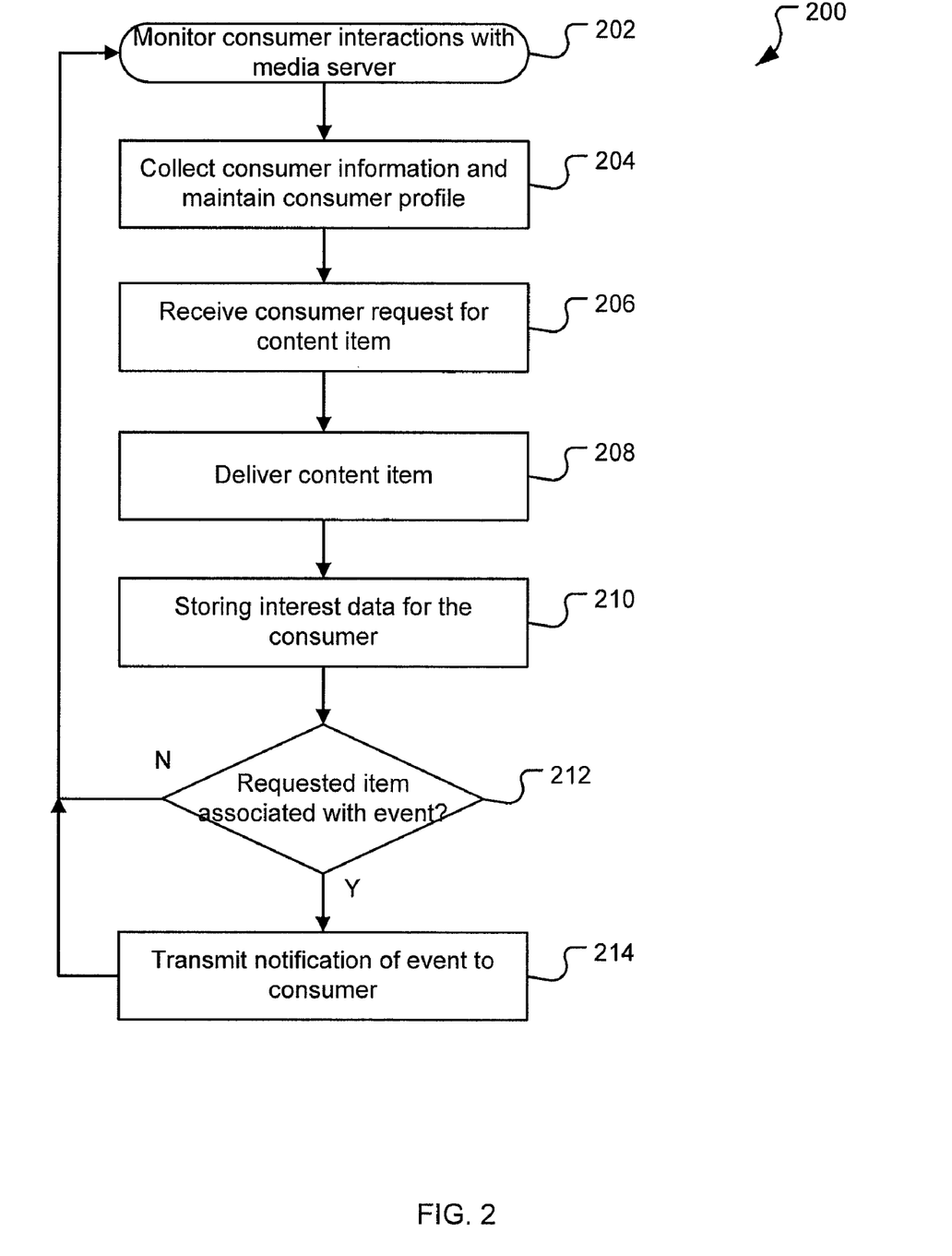
FIG. 2 is an embodiment of a method of automatically recommending an event to a consumer based on the consumer's consumption of media.

FIG. 2 is an embodiment of a method of automatically recommending an event to a consumer based on the consumer's consumption of media. In the embodiment shown, the method 200 begins with a monitoring operation 202 in which a consumer's interactions with a media server are monitored. As the consumer interacts with the media server (e.g., by accessing media content items such as songs or videos, purchasing such items, rating or reviewing such items, alerting friends or other parties of the items, etc.), a maintain consumer profile operation 204 is performed in which consumer information is collected and stored in a datastore maintained by the system as information related to the consumer. The maintain consumer profile operation 204 is an ongoing operation performed by a media server in which consumer interactions are monitored and data describing those interactions are recorded. In an embodiment, information that identifies each media content item accessed by a consumer is recorded as well as information describing the nature of the interaction, such as a purchase, a rendering, a streaming, a user rating, etc. Such information is then maintained as a consumer profile accessible to the various components of the system. Thus, in an embodiment, the system collects a complete media content item consumption history of the consumer including any information about how the consumer likes or dislikes each particular content item. The consumer information may be stored in a datastore, such as the user information database as described above. The stored consumer information may be used to create a consumer profile containing the consumer's consumption history. As discussed above, a consumer profile may refer to a specific data structure maintained in a datastore or may refer generally to data that is associated with the consumer by the system, such as in a relational database.

In an embodiment, the consumer profile also includes information identifying at least one consumer location associated with each consumer known to the system. This location may be provided by the consumer as part of an initial act of setting up the consumer's profile (e.g., when the consumer first accesses and becomes a member of the service). Alternatively, or in addition to the location information provided explicitly by the consumer, the consumer's information may include information deduced from the consumer's interaction with the system. For example, if the consumer's rendering device is adapted to provide location information back to the system, a history of the consumer's location may be stored. From this location history it may be determined that the consumer has more than one consumer location for which the consumer spends a significant amount of time. In an alternative embodiment, when a user makes purchases through the system, a consumer location may be derived from the shipping or billing location provided as part of the transaction.

Information associated with a consumer in the consumer's profile that relates to the consumer's consumption history and the consumer's likes and dislikes of media content items may be referred to generally as the consumer's interest data. A consumer's interest data is distinct from other data stored in the consumer's profile such as the consumer's location, demographic information, associated parties such as friends in the consumer's network or community, etc.

During the consumer's interaction with the system, on one or more occasions a consumer will make a request related specifically to a media content item from or via the system, such as a request to stream or transmit a media file. The consumer's request is received by the system in a receive request operation 206. The request may be for the purchase of a specific media file, such as a song, or may be a general request to stream music to the consumer's device, such as a request to play music from a virtual radio station. The request may also take the form of a request to rate or review a specific media content item.

Regardless of the exact nature of the request, the request is interpreted by the system as a request for a particular media content item and the system responds by performing the requested service. In the embodiment shown, this is illustrated by the delivery operation 208 in which a copy of the media content item is delivered to the consumer. The delivery operation 208 may take the form of streaming media data to the consumer's device, transmitting a media file to the user's device or recording a rating or review for the media content item.

In addition to performing the requested service related to the media content item in the delivery operation 208, the system also records consumer information including the consumer's interest data related to the transaction in a store interest data operation 210. In the operation 210, the interest data identifying the media content item that was the subject of the request is stored in the consumer profile.

The system further determines if the media content item that is the subject of the consumer's request is associated with an event in the event datastore in a determination operation 212. In the determination operation 212, the consumer's profile and the information in the event datastore are compared to identify any events that are associated with the media content item. If an event associated with the media content item is not found, then the system returns to the monitoring operation 202. However, if an event associated with the media content item is found by the determination operation 212, then a notification is transmitted to the consumer in a transmit notification operation 214.

In an embodiment, the determination operation 212 may be considered a two step operation in which it is first determined if the media content item is sufficiently related to an event in the event datastore (e.g., the media content item and the event have a common artist or genre). This is followed by evaluating a set notification criteria to determine if the consumer should be notified of the event (e.g., are the consumer and event collocated, does the consumer meet display criteria contained in the event data, does the event meet the notification preferences provided by the consumer). Alternatively, the determination operation 212 could be considered a single operation in which progressive filtering steps are performed to determine if a notification should be transmitted to the consumer. Regardless of how the determination operation 212 is designed to function internally, the determination operation 212 accesses the consumer's profile and the event data and makes a determination as to whether to transmit an event notification to the consumer or not.

As discussed above, the determination operation 212 may be a simple comparison of relatively few data elements in the consumer's profile and the event data for each event in the event datastore. For example, for an event and a media content item to be associated a determination that the two are collocated may be the only necessary criterion. Such a simple comparison may be appropriate for locations with very low populations where events are rare and no relationship is necessary between the event and the media content item.

Alternatively, a more complex comparison may be performed in which a consumer's consumption history must indicate that the consumer is likely to be genuinely interested in the event. For example, in order to deliver an unsolicited event notification of an artist's concert the event recommendation system may require that the consumer has listed at least a threshold number of songs for that artist in one or more of the consumer's playlists. Alternatively, the system may require that the consumer have specifically requested that the media content item have been rendered a certain number of times or have been purchased within a specified time period (e.g., the song must have been purchased or played at least 10 times within the last month).

In yet another embodiment, an association further may be based on actions by members within the consumer's network of friends or associates. For example, if the consumer lists several friends for which profiles are available, associations may be made based on those associated friends' profiles as well.

In yet another embodiment, a consumer's history of attending events may be included in the consumer's profile and used to determine whether an event is sufficient associated with the consumer to warrant notification.

As described above, the determination operation 212 in addition may optionally based on requirements and criteria included in the event data. For example, a promoter may wish to target a specific demographic such as males with incomes greater than a threshold amount located in a specified area. The promoter may have provided these criteria as association requirements that must be meet prior to transmitting the event notification, in addition to the consumer accessing the media content item. For example, a concert event featuring an artist which is sponsored by a automobile company may wish to target potential purchasers of the company's vehicles. Thus, the event promoter may be less inclined to advertise the event to the artist's fans than to advertise the event to the potential purchasers of the company's vehicle.

Consumer preferences may also be consulted when performing the determination operation 212. For example, a consumer may have listed a specific artist as one for which the consumer wishes to receive event notifications for, regardless of what the event location is. Likewise, a consumer may have listed a particular venue as one for which the consumer does or does not wish to receive event notifications for.

In yet another embodiment, a consumer may have identified a set of consumer event criteria which the system interprets as additional or alternative criteria to its default association criteria. For example, a consumer may list as a preference that the consumer only be notified of events that the system would otherwise associate with the media content item which are also events on specified days of the week (e.g., only on Friday or Saturday), at specified locations and/or venues (e.g., only at Red Rocks Amphitheater), and that have a specified range of entry prices (e.g., only events that charge less than $35 for a ticket).

As can be seen by the examples provided above, how a determination is made that an event is associated with a media content item is limited only by one's imagination and the event data and media content data available to the system. Furthermore, the use of additional screening criteria to limit transmission of notifications to certain consumer's based on event data and a consumer's profile is also limited only by one's imagination and the availability of data. Furthermore, to those skilled in the art further examples are not necessary to illustrate how a media content item may be determined to be associated with an event in an event datastore.

Figure 3:
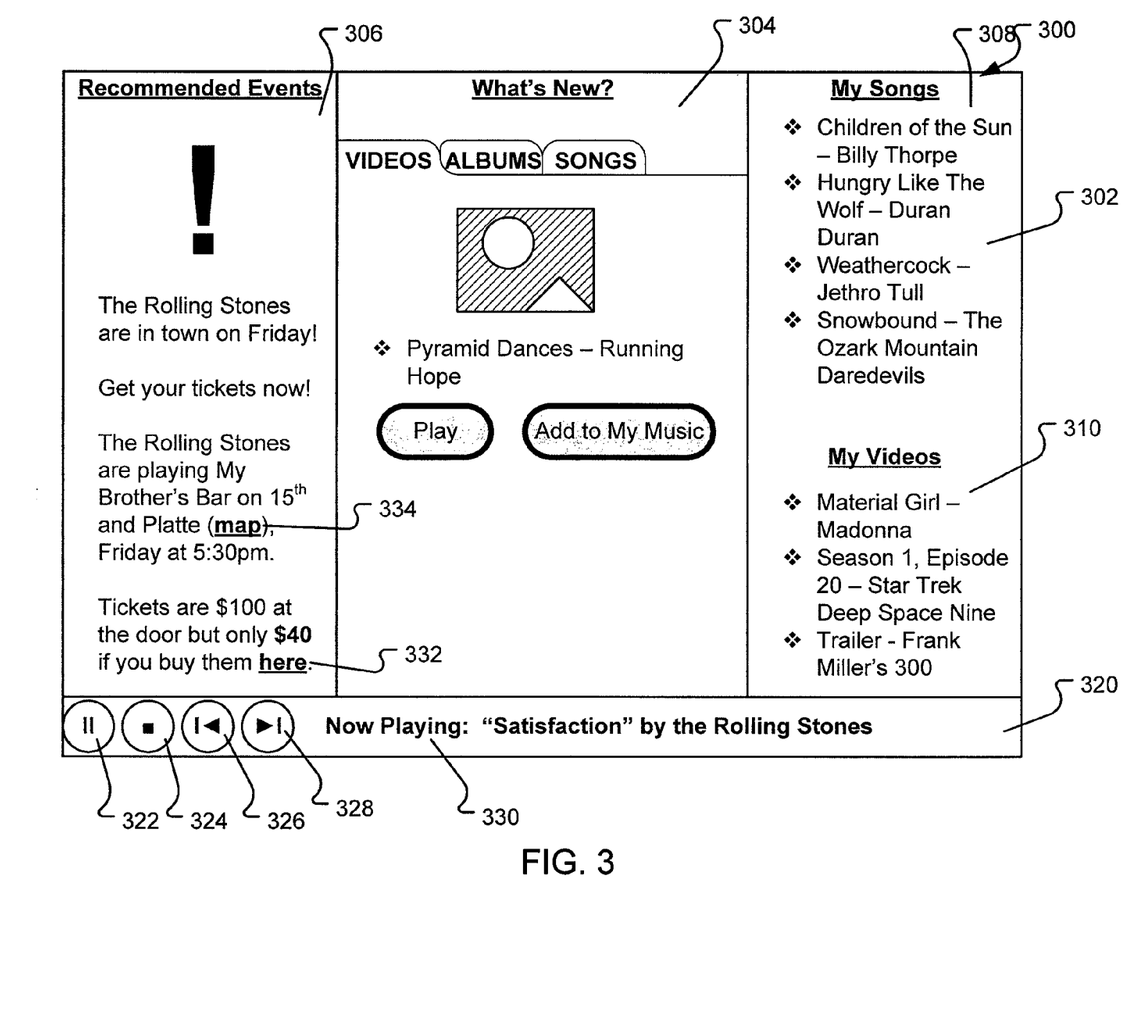
FIG. 3 illustrates an embodiment of GUI presented by a media server to a consumer.

As mentioned above, if an event associated with the media content item is found by the determination operation 212, then a notification is transmitted to the consumer in a transmit notification operation 214. The transmit notification operation 214 may include displaying an event notification to the consumer via the same graphical user interface through which the consumer requested the media content item. For example, the consumer may be interacting with the system via a music home page graphical user interface (GUI) as shown in FIG. 3. Upon determination that there is an associated event, the event data may be presented to the consumer in some area of the GUI.

Alternatively, the transmit notification operation 214 may generate a second browser window (e.g., a "pop-up window"), an email addressed to the consumer, or a text message to the consumer's device with the event notification. The event notification may include some or all of the event data, such as the time, place, and description of the event. In addition, ancillary promotional information may be provided with the notification or may be accessible through the notification. For example, coupons, parking vouchers, or entry codes may be provided that allow consumer discounts, special access or other benefits over the general public. After transmission of the event notification, the system returns to the monitoring operation 202.

FIG. 3 illustrates an embodiment of GUI presented by a media server to a consumer. In the embodiment shown, the GUI 300 is a rendered web page served by the media server and displayed on the consumer's device. The GUI 300 may be displayed within a browser window (not shown) that includes the typical browser navigation and control tool bars (not shown). The GUI 300 includes several display areas 302, 304, 303. In a first display area 302, a my songs list 308 and a my videos list 310 are shown. Each list 308, 310 is a consumer's playlist maintained by the media server. Through the interface, the consumer can see and select media content items, such as songs, from the lists 308, 310 to be rendered. The lists 308, 310 display metadata, e.g., title and artist, for each media content item listed. Associated with the metadata for each content item, but not shown in this embodiment, is a location identifier for each media content item in the list. The location identifier may be a cataloged media file identifier, a network address or even a simple pointer to the associated file in the media datastore.

The GUI 300 further includes advertisements of media content items that are not on the consumer's playlists. For example, a second area 304 includes recommendations of different new media content items that may not be known to the consumer but that the media server believes may be of interest to the consumer based on some data, such as the consumer's demographic, consumption history or tastes. The second area 304 further includes a media content item description that may include a graphic associated with the media asset (album cover art or photograph of artist), textual metadata (artist and title), and two consumer-selectable control elements 312, 314. One control element 312 is a play button that will cause the media content item to be delivered and rendered on the consumer's device. The second control element 314 is an "add to my music" button that will cause the media content item to be added to the consumer's list 308 or 310. As the GUI is presented by the media server, the asset displayed is likely to be maintained in the library, therefore selection of the second add to my music button control element 314 will cause the appropriate metadata related to the media content item to be added to the appropriate consumer's list.

In the GUI 300 illustrated, a media rendering control panel 320 is provided through which the consumer can monitor and control the rendering of media via the GUI 300. In the embodiment shown, the control panel 320 includes a standard set of media playback controls (i.e., a pause/resume control 322, a stop control 324, a go to start control 326, and a go to next control 328). In addition is a display area 330 that indicates what media content item is currently being rendered and various metadata about the content item.

The GUI further includes a recommended events area 306 that illustrates a notification of one or more recommended events. In the GUI 300 shown, a notification concerning the Rolling Stones, which also happens to be the artist of the media content item being rendered, is displayed. The event data includes the date, time, location, and description of the event. In addition, a hyperlink 334 to a map to the location is provided. A promotional element is also further provided, in this example a greatly reduced ticket price if the consumer purchases tickets through the media server via a hyperlink 332 to a ticket purchase web page.

Figure 4:
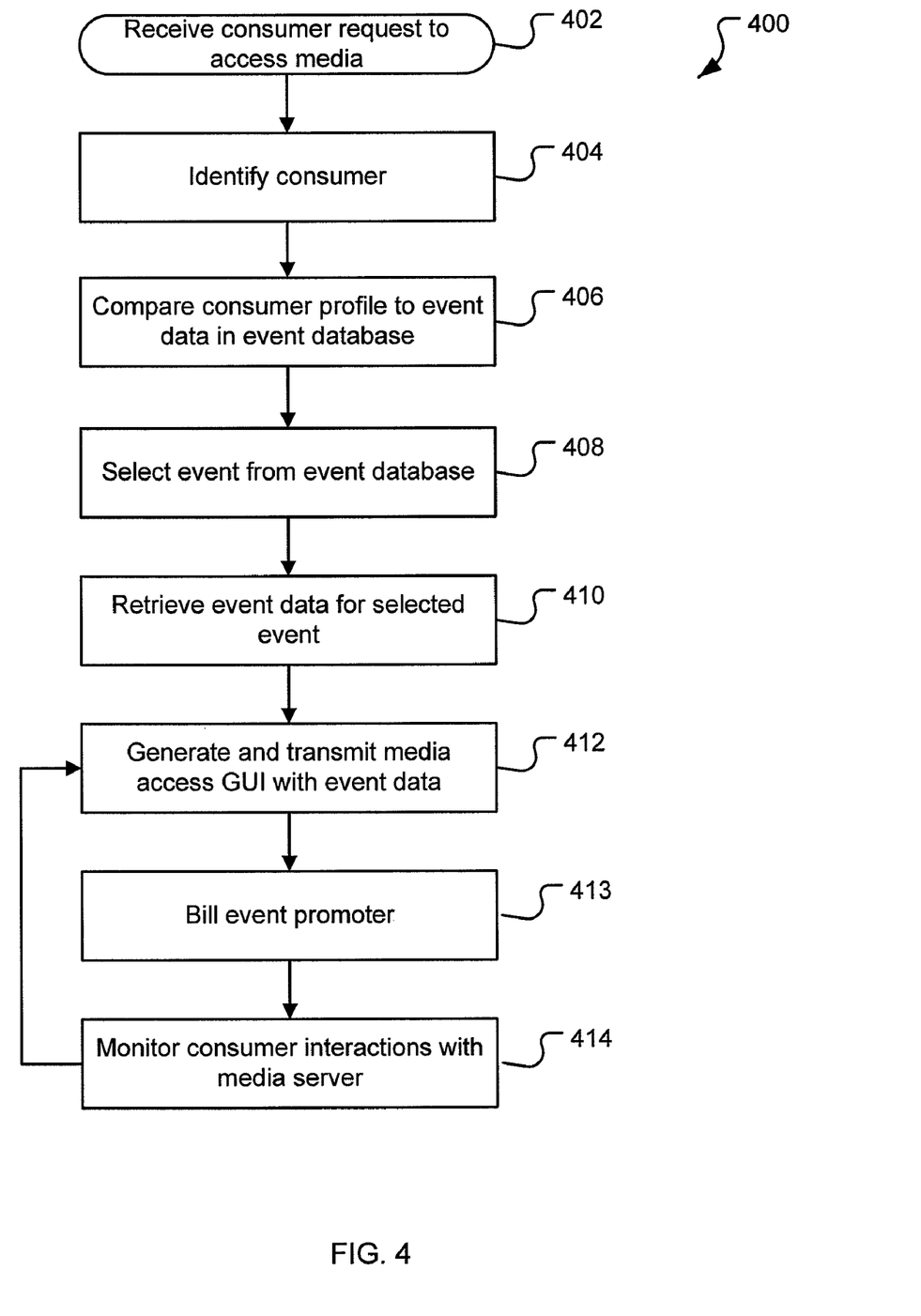
FIG. 4 illustrates yet another embodiment of a method for automatically recommending an event to a consumer based on the consumer's consumption of media.

FIG. 4 illustrates yet another embodiment of a method for automatically recommending an event to a consumer based on the consumer's consumption of media. In the embodiment shown, the method 400 begins when a consumer accesses a GUI, such as the GUI illustrated in FIG. 3, through which the consumer can access and render media content items. In the method 400, a consumer requests access to the GUI in an request access operation 402. As part of the request access operation 402, the consumer may be required or requested to login to the system so that the consumer may be identified and the consumer's information, such as from the consumer's profile, may be accessed.

The request may be in the form of a request for a web page through which the consumer can access an online library of music or other media content items. In this case, the request may be an HTML GET request for a web page (e.g., http://music.yahoo.com) corresponding to the home page of a media library service. In an alternative embodiment, The request may take the form of the consumer accessing a media player on the consumer's rendering device. In response, the media player may retrieve or otherwise access the event and consumer profile data as described below, such as through communication with a remote server.

In response to the request, the system identifies the consumer in an identification operation 404. In the identification operation 404, information in the request, including any login information provided by the consumer, is used to identify and access the consumer's profile. In an embodiment, a data structure such as a cookie may be accessed on the consumer's device, allowing the system to identify the consumer without an explicit login procedure being performed. Methods of verifying and identifying identities in electronic transactions are known in the art and any suitable method or procedure may be used.

Information from the consumer's profile is then retrieved and compared to the current event data in the event database in a comparison operation 406. In the comparison operation 406, the consumer's information including the consumer's consumption history, location and other known information is compared against the current events in the event database.

Based on the comparison, a selection operation 408 selects an event from the event database for display to the consumer. Any suitable method of selecting the event including those described above may be used.

In an embodiment, each of the events in the event database are ranked based on the comparison. The ranking is an estimation of the potential that the consumer will be interested in the event—the highest ranked event being the event most likely for the consumer to be interested in. The ranking allows more than one event to be displayed, such as in a listing of events, to the consumer.

Regardless of the selection process, after the selection has been made, the event data is retrieved from the event database in a retrieve event data operation 410. This may include the event title, date and other information. In addition, this may include generating additional content and performing other actions that the consumer in unaware of. For example, a code or coupon that uniquely identifies the consumer may be generated for transmission with the notification. This may be used to verify that the consumer attended the event, in which case the event notification system operator may be compensated at some predetermined rate to reward the operator for successfully advertising the event.

Next a generate GUI operation 412 is performed in which a GUI displaying at least some of the event data, for example in an event display area, is generated. In an embodiment, the generate GUI operation 412 may generate an HTML page for display to the consumer via a browser on the consumer's device. In an alternative embodiment, the generate GUI operation 412 may include packaging and transmitting the necessary data to a program on the consumer's device with which the program can generate the GUI. Regardless, the event data is then used to generate at least a portion of the GUI, that portion containing a notification of the event and the GUI is displayed to the consumer.

In addition, the generation and display of the event notification may trigger a billing operation 413 in which the event promoter is billed, in this case the event promoter paying on a per notification basis, regardless of whether the consumer ultimately attends the event. Thus, a record of the event notification may be generated and transmitted to the event promoter, such as in the form of a bill. In an embodiment, the system operator may then ultimately be compensated more than once for a notification to a specific consumer. This is illustrated by the bill event promoter operation 413. The billing may be performed each time an event notification for that promoter's event is displayed to a consumer or, alternatively, the information may be collected and the promoter may be billed periodically in aggregate for all event notifications transmitted within the billing period.

In an embodiment, as the consumer interacts with the system via the GUI, the system may regenerate the event notification portion of the GUI in response to the consumer's actions. For example, in an embodiment, the method of FIG. 2 is used to revise the GUI as the consumer accesses and requests media content items. This is illustrated by the monitor operation 414 in FIG. 4, in which, if the user interaction triggers another event notification, the method 400 returns to the generate GUI operation 412 and a new GUI is generated and transmitted with the new event notification.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, instead of or in addition to display event notifications on a GUI of the media player, e-mails or other types of communications may be used to notify the consumer of an upcoming event. Depending on how closely associated an event is with a consumer's consumption history, These addition notifications may be sent. Numerous other changes may be made which will readily suggest themselves to those skilled in the art and which are encompassed in the spirit of the invention disclosed and as defined in the appended claims.

What is claimed is:

1. A method of notifying consumers of events comprising:
    maintaining, by at least one server computer, a consumer profile for a consumer, the consumer profile including a community location of the consumer;
    receiving, by the at least one server computer, a request from the consumer, the request identifying a media content item;
    storing, in the consumer profile, interest data identifying the consumer's interest in the media content item identified in the consumer's request;
    determining, by the at least one server computer, an upcoming future first event based on the consumer's interest in the media content item identified in the consumer's request, an association between the upcoming future first event and the media content item, and on a determination that the upcoming future first event's community location corresponds to the consumer's community location;
    causing, by the at least one server computer, a response to the consumer's request; and
    transmitting, by the at least one server computer to the consumer, a notification of the upcoming future first event, the notification is in addition to the response to the consumer's request.

2. The method of claim 1 wherein the request from the consumer is a request to render the media content item on a device associated with the consumer and the method further comprises:
    streaming the media content item to the device associated with the consumer.

3. The method of claim 2 wherein the request from the consumer is a request to purchase a copy of the media content item and the method further comprises:
    delivering a copy of the media content item to the consumer.

4. The method of claim 1 wherein the request from the consumer contains a rating of the media content item indicative of a consumer's evaluation of the content item and the method further comprises:
    storing, in the consumer profile, interest data identifying the rating of media content item; and
    if the rating of the media content item is greater than a predetermined threshold, transmitting the notification to the consumer.

5. The method of claim 1 further comprising:
    receiving event data for the upcoming future first event, the event data identifying community location for the upcoming future first event, an event date, and containing information associating the upcoming future first event with the media content item; and
    comparing the event data with the consumer profile; and
    transmitting the notification if the event date for the upcoming future first event is at a future time.

6. The method of claim 5 wherein determining further comprises:
    identifying an author of the media content item; and
    determining, based on the event data, that the author is associated with the upcoming future first event.

7. The method of claim 5 wherein determining further comprises:
    identifying a genre of the media content item; and
    determining, based on the event data, that the genre is associated with the upcoming future first event.

8. The method of claim 1 further comprising:
    identifying a party associated with the consumer; and
    transmitting, to the party, the notification of the upcoming future first event.

9. A method comprising:
    transmitting, one or more songs to a device in a response to a consumer request, the one or more songs being identified in the consumer request received by at least one server computer via a user interface on the device associated with the consumer;
    storing, by the at least one server computer, information identifying the consumer including a community location of the consumer and interest of the consumer in the one or more songs identified in the consumer request; and
    selecting, by the at least one server computer, at least one upcoming future event from a database comprising upcoming future events, wherein each upcoming future event has an associated community location and an event description and wherein the selecting of the at least one upcoming future event is based at least in part on the interest of the consumer in the one or more songs identified in the consumer request transmitted to the device, a determined association between the at least one upcoming future event and the one or more songs transmitted to the device, a determined correspondence between the upcoming future event's community location and the consumer's community location, and the event description; and causing the selected at least one upcoming future event to be sent to the consumer, the notification being in addition to the response to the consumer request.

10. The method of claim 9 further comprising:
displaying the event data to the consumer via the user interface on the device.

11. The method of claim 9 further comprising:
receiving a consumer rating associated with a first song; and
storing the consumer rating as information of the consumer's interest in the first song, wherein said selecting the at least one upcoming future event is further based on the consumer rating.

12. The method of claim 11 further comprising:
determining an author of the first song,
wherein said selecting the at least one upcoming future event is further the author.

13. The method of claim 9 wherein each upcoming future event is associated with an event promoter and the method further comprises:
transmitting the event data of the at least one upcoming future event to the device; and
transmitting to the event promoter associated with the at least one upcoming future event information indicating that event data of the at least one upcoming future event was transmitted to a consumer.

14. The method of claim 9 further comprising:
receiving selections from the consumer identifying one or more favorite songs of the consumer via the user interface;
storing a record of the consumer's favorite song selections,
wherein said selecting the at least one upcoming future event is further based on the consumer's favorite song selections.

15. The method of claim 9 further comprising:
receiving selections from the consumer identifying one or more favorite music genres of the consumer via the user interface;
storing a record of the consumer's favorite music genre selections,
wherein said selecting the at least one upcoming future event is further based on the consumer's favorite music genre selections.

16. A system comprising:
at least one server computer, each server computer coupled to memory and comprising a processing unit;
the memory storing:
a first datastore of media content items;
a second datastore of events, each event having community location and event data associating the event with one or more media content items;
a third datastore of consumer profiles; each consumer profile associated with a consumer and including a community location and information identifying an interest in the media content items requested by the associated consumer; and
the at least one server computer executing a user interface module that, in response to a first consumer's request that identifies a first media content item in the first datastore, causes a response to the first consumer's request, and transmits a notification of an upcoming future first event to the first consumer, the notification is in addition to the response to the first consumer's request, the upcoming future first event being selected from the event data in the second datastore based on an association between the upcoming future first event and the first media content item identified in the first consumer's request, the consumer's interest in the first media content and a determined correspondence between the consumer's community location included in the consumer profile of the first consumer in the third datastore and the event's community location.

17. The system of claim 16 wherein the user interface module further retrieves the first media content item from the first datastore and transmits the first media content item to the first consumer in response to the request from the first consumer.

18. The system of claim 17 wherein the user interface module further generates a renderable graphical user interface in the form of a web page through which the first consumer can render the first media content item and the notification.

19. The system of claim 16 further comprising:
the at least one server further executing an event logging module through which event promoters can submit events for addition to the second datastore.

20. The system of claim 18 wherein
each media content item is associated with an artist,
the event data identifies a first artist that is also associated with the first media content item, and
the community location of the upcoming future first event and the consumer's community location of the consumer are within a predetermined distance.

21. A computer-readable non-transitory storage medium tangibly storing computer-executable instructions for performing a method comprising:
receiving a request to access a media player via a consumer device;
retrieving a consumer profile containing consumer information including a consumer's community location and information identifying an interest of the consumer in at least one media content item previously rendered by the media player to the consumer;
selecting an upcoming future first event based on a community location associated with the upcoming future first event and the consumer's community location and based on a determined association between the upcoming future first event and the at least one media content item and the information identifying the consumer's interest in the at least one media content item; and
generating a graphical user interface, the graphical user interface including a media player portion in response to the request, wherein in addition to the response to the request at least a portion of the graphical user interface displays event data for the upcoming future first event.

22. The computer-readable non-transitory storage medium of claim 21 further comprising computer-executable instructions for:
transmitting the graphical user interface to the consumer device.

23. The computer-readable non-transitory medium of claim 21,
wherein said selecting further comprising computer-executable instructions for:
selecting the upcoming future first event from a database comprising upcoming future events, wherein each upcoming future event has a community location and an event description, and wherein the selecting is based at least in part on the information identifying the consumer's interest in the at least one media content item transmitted to the device, the upcoming future first event's community location, the consumer's community location and the event description.

24. The computer-readable non-transitory storage medium of claim 21 further comprising computer-executable instructions for:
   receiving a render request to render a media content item; and
   in response to the render request, selecting an upcoming future second event based on the consumer's community location, the consumer's interest in the media content item; and
   revising the graphical user interface so that the at least a portion of the graphical user interface displays event data for the upcoming future second event.

25. The computer-readable non-transitory storage medium of claim 21 further comprising computer-executable instructions for:
   receiving confirmation that the consumer attended the upcoming future first event; and
   billing an event promoter identified in the event data for the upcoming future first event a pre-determined amount.

* * * * *